United States Patent [19]

Burlingame

[11] Patent Number: 4,678,977
[45] Date of Patent: Jul. 7, 1987

[54] SETPOINT CONTROLLER

[75] Inventor: Harry H. Burlingame, Seattle, Wash.

[73] Assignee: The Boeing Company, Seattle, Wash.

[21] Appl. No.: 787,519

[22] Filed: Oct. 15, 1985

[51] Int. Cl.[4] .......................................... G05B 19/28
[52] U.S. Cl. ..................................... 318/601; 318/610
[58] Field of Search ............... 318/601, 610, 611, 600; 364/160

[56] References Cited

U.S. PATENT DOCUMENTS

| | | | |
|---|---|---|---|
| 2,648,806 | 8/1953 | Dinley | 318/163 |
| 2,952,500 | 9/1960 | Trechsel | 346/17 |
| 3,254,566 | 6/1966 | Bradner | 90/4 |
| 3,322,994 | 5/1967 | Dever et al. | 313/267 |
| 3,356,918 | 12/1967 | Williams | 318/18 |
| 3,400,314 | 9/1968 | Wilson | 318/18 |
| 3,512,066 | 5/1970 | Gerber et al. | 318/138 |
| 3,523,229 | 8/1970 | Black et al. | 318/601 |
| 3,545,398 | 12/1970 | Fisher et al. | 114/144 |
| 3,752,969 | 8/1973 | Kiffmeyer et al. | 318/601 |
| 4,117,382 | 9/1978 | Yonemoto | 318/163 |
| 4,211,967 | 7/1980 | Akiyama et al. | 318/490 |
| 4,227,072 | 10/1980 | Fancy et al. | 235/92 |
| 4,245,297 | 1/1981 | Bertram | 318/601 X |
| 4,266,169 | 5/1981 | Hölzler et al. | 318/490 |
| 4,294,531 | 10/1981 | Shenk | 318/601 |
| 4,398,137 | 8/1983 | Janicki et al. | 318/601 |
| 4,430,606 | 2/1984 | Otsuki et al. | 318/601 |

Primary Examiner—Benjamin Dobeck
Attorney, Agent, or Firm—Christensen, O'Connor, Johnson & Kindness

[57] ABSTRACT

A dual setpoint controller system comprising first (24) and second (26) setpoint controllers. Each setpoint controller comprises a target counter (30, 80) for storing a digital target value, control elements (38, 40, 88, 90) for enabling an operator to control the target value, a setpoint counter (32, 82) for storing a digital setpoint value, and comparison means (42, 44, 92, 94) operative when the setpoint value is not equal to the target value for causing the setpoint value to change at a selected rate towards the target value. Each target value is displayed via a display device (34, 84), and a digital-to-analog converter (36, 86) is provided for converting each setpoint value to an analog signal. Means are provided for enabling new target values to be loaded into the target counter by actuation of a load switch, and for permitting operator selection between a RAMP mode in which the setpoint values ramp towards the target values upon receipt of a start signal, and a TRACK mode in which they continuously track towards the target values.

15 Claims, 4 Drawing Figures

SETPOINT CONTROLLER

FIELD OF THE INVENTION

The present invention relates to setpoint controllers and, in particular, to a setpoint controller that is particularly adapted for use in a dual setpoint control system for controlling the speeds of two interrelated moving members.

BACKGROUND OF THE INVENTION

The control system for controlling the speed of a turbine or other rotating member typically includes means for providing a setpoint or reference signal that represents the desired rotational speed. A servo circuit compares the setpoint signal with a feedback signal representing the actual speed to produce an error signal that is used to minimize the difference between the setpoint and actual speeds. Although for some applications a setpoint controller could simply comprise a potentiometer, there are many applications for which a more precise and versatile method of controlling the setpoint is required. For example, during testing of a propeller turbine drive, it may be required to rotate the propeller at a known rate for a prescribed time period, then accelerate the propeller to a second known rate at a prescribed ramping (i.e., acceleration) rate, etc. In carrying out such a program, the convenience and versatility of the setpoint controller can be a significant factor in minimizing testing time, an important consideration during wind tunnel testing in which the on-line testing time is limited and expensive. An even more demanding application for a setpoint controller is one in which the speed of two related elements must be controlled. An example of such an application is wind tunnel testing of a twin turbine counter-rotating propeller system for a jet aircraft engine. To test such a system, it is necessary to rapidly cycle between different speed levels for the different propellers, and to provide means for precisely establishing the relative speeds and relative acceleration or decelerations of the individual propellers. No prior setpoint controller or controller systems have been found adequate to efficiently test such a system.

SUMMARY OF THE INVENTION

In one embodiment, the setpoint controller of the present invention comprises target means, control means, setpoint means and comparison means. The target means is operative to store a digital target value, and the setpoint means is operative to store a digital setpoint value. The control means enables an operator of the setpoint controller to control the target value stored in the target means. The comparison means is operative when the setpoint value is not equal to the target value for causing the setpoint value to change at a selected rate towards the target value. The setpoint controller also perferably comprises display means for displaying the target value, and means for converting the setpoint value to a corresponding analog signal.

The control means may comprise means for storing a load value entered by the operator, and means for setting the target value equal to the load value in response to a load signal. The control means may also comprise tracking means including a movable member and means operative to increment the target value when the movable member is moved in one direction and to decrement the target value when the movable member is moved in the opposite direction. The setpoint controller also preferably comprises means controllable by the operator for varying the selected rate at which the setpoint value changes towards the target value.

In a preferred embodiment, the comparison means comprises logic means having first and second states. The comparison means causes the setpoint value to change towards the target value only when the logic means is in the first state. The logic means changes from the first state to the second state when the setpoint value becomes equal to the target value, and changes from the second state to the first state upon receipt of a start signal. In this mode of operation, after the setpoint and target values have become equal, the setpoint value will change towards the target value only upon receipt of the start signal. The setpoint controller may further comprise mode selection means for enabling the operator to cause the logic means to remain in the first state, whereby the setpoint value changes towards the target value regardless of whether the start signal has been received.

In a further aspect, the present invention comprises a dual setpoint controller system comprising first and second setpoint controllers. The first setpoint controller comprises first target means operative to store a digital first target value, first control means for enabling an operator to control the first target value, first setpoint means opearative to store a digital first setpoint value, and first comparison means operative to cause the first setpoint value to change at a selected rate towards the first target value. The second setpoint controller similarly comprises second target means operative to store a digital second target value, second control means for enabling an operator to control the second target value, second setpoint means operative to store a digital second setpoint value, and second comparison means operative to cause the second setpoint value to change at said selected rate towards the second target value. The first and second setpoint values can therefore be caused to change towards different target values at the same selected rate. The first control means may comprise first input means for storing a first load value entered by the operator, and the second control means may comprise second input means for storing a second load value entered by the operator. The first and second control means each comprises means for setting the respective first and second target values equal to their respective first and second load values in response to a single load signal. The first and second comparison means may comprise respective first and second logic means. Each logic means has first and second states, and each comparison means is operative to cause the respective setpoint value to change towards the respective target value only when the respective logic means is in the first state. Each logic means changes from the first to the second state when the respective setpoint value becomes equal to respective target value, and changes from the second to the first state upon receipt of a start signal, the start signal being common to the first and second setpoint controllers.

DETAILED DESCRIPTION OF THE DRAWINGS

Figure 1:
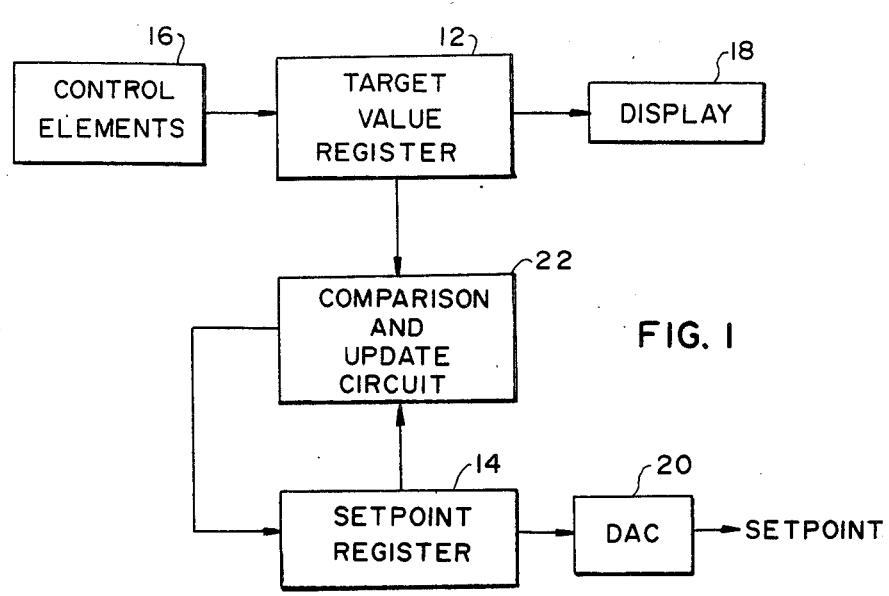
FIG. 1 is a block diagram of a setpoint controller according to the present invention.

FIG. 1 sets forth in block diagram form a setpoint controller according to the present invention. The setpoint controller includes target value register 12 and setpoint register 14. Target value register 12 contains a target value for the setpoint. The target value is entered or otherwise specified by an operator through control elements 16. The target value in target value register 12 is displayed via display 18 that may comprise a conventional LED display system. Setpoint register 14 contains the setpoint value that is output by the system, the setpoint value in register 14 being converted to an analog setpint signal by digital-to-analog converter 20. Comparison and update circuit 12 compares the target value in target value register 12 with the setpoint value in setpont register 14. If the target and setpoint values differ, the comparison and update circuit modifies the setpoint value so as to minimize the difference. The setpoint value is modified by continuously changing its value, at a preselected rate, toward the target value. In a preferred embodiment, the preselected rate is selectable by the operator.

The setpoint control system illustrated in FIG. 1 contains a number of features that make the system particularly useful for testing purposes. In a test environment, the actual rotation speed of the turbine or other element will invariably be recorded by suitable transducers. The speed setting of particular interest to the test operator is the target speed, which speed is the speed displayed by the setpoint controller of FIG. 1. The use of two registers (i.e., target value register 12 and setpoint register 14) provides a system of far greater varsatility than a single register system. For example, in a two register system, the target value to which the setpoint is ramping and the ramping rate can be precisely and independently controlled. If setpoint register 14 is incrementing towards a target value in target value register 12, the operator can modify the target value without in any way disturbing the ramping rate or test sequence. On the other hand, the operator can instantaneously change an upwardly ramping setpoint value to a setpoint value that is downwardly ramping at an identical rate simply by changing the target value while the setpoint value is ramping upward. Other advantages of the dual register approach will become apparent in connection with the dual setpoint controller discussed below.

It is sometimes required to control and test a pair of interrelated moving elements, such as a pair of counter-rotating propellers for use in a jet aircraft engine. A dual setpoint control system suitable for such an application is illustrated in block diagram form in FIG. 2. The setpoint control system of FIG. 2 comprises a pair of setpoint controllers 24 and 26, each of which is similar to the setpoint controller shown in FIG. 1. Setpoint controller 24 comprises target counter 30, setpoint counter 32, display 34 and digital-to-analog converter 36, these elements functioning in a manner similar to target value register 12, setpoint register 14, display 18 and digital-to-analog converter 20 of the setpoint controller of FIG. 1. An operator may enter a target value into target counter 30 via rotary incrementor 38 or thumbwheel switches 40, the operation of these control elements being described in greater detail below. The comparison and update function corresponding to block 22 of FIG. 1 is accomplished by comparator 42 and count logic 44. Comparator 42 compares the target value in target counter 30 with the setpoint value in setpoint counter 32, and provides output signals on lines 45–47 that indicate the relationship between these values. In particular, a signal is provided on line 45 when the target value is equal to the setpoint value (T=S), a signal is provided on line 46 when the target value is greater than the setpoint value (T>S), and a signal is provided on line 47 when the target value is less than the setpoint value (T<S). Count logic 44 operates in response to the signals on lines 45–47 and to three additional input signals: a RAMP signal on line 48, a START/TRACK signal on line 50 and a CLOCK signal on line 52. In response to these inputs, count logic 44 may produce a series of pulses on line 66 or line 68. Pulses on line 66 cause setpoint counter 22 to count up, and pulses on line 68 cause setpoint counter 32 to count down. The logic by which count logic circuit 44 produces signals on lines 66 and 68 is described below. In either case, the setpoint value is ramped towards the target value at a rate determined by the frequency of the CLOCK signal. The setpoint value is converted to an analog output signal SETPOINT 1 by digital-to-analog converter 36.

The CLOCK signal is provided by clock generator 54, and the frequency of the CLOCK signal produced by the clock generator is controllable by ramp rate potentiometer 56 that may be varied by an operator of the system. The RAMP and START/TRACK signals are provided by switch circuit 58. The switch circuit also provides a LOAD signal on line 70 that is input to target counter 30. As described below, switch circuit 58 produces the RAMP, START/TRACK, and LOAD signals in response to operator actuation of ramp/track switch 60, ramp start switch 62 and load setpoint switch 64.

Figure 2:
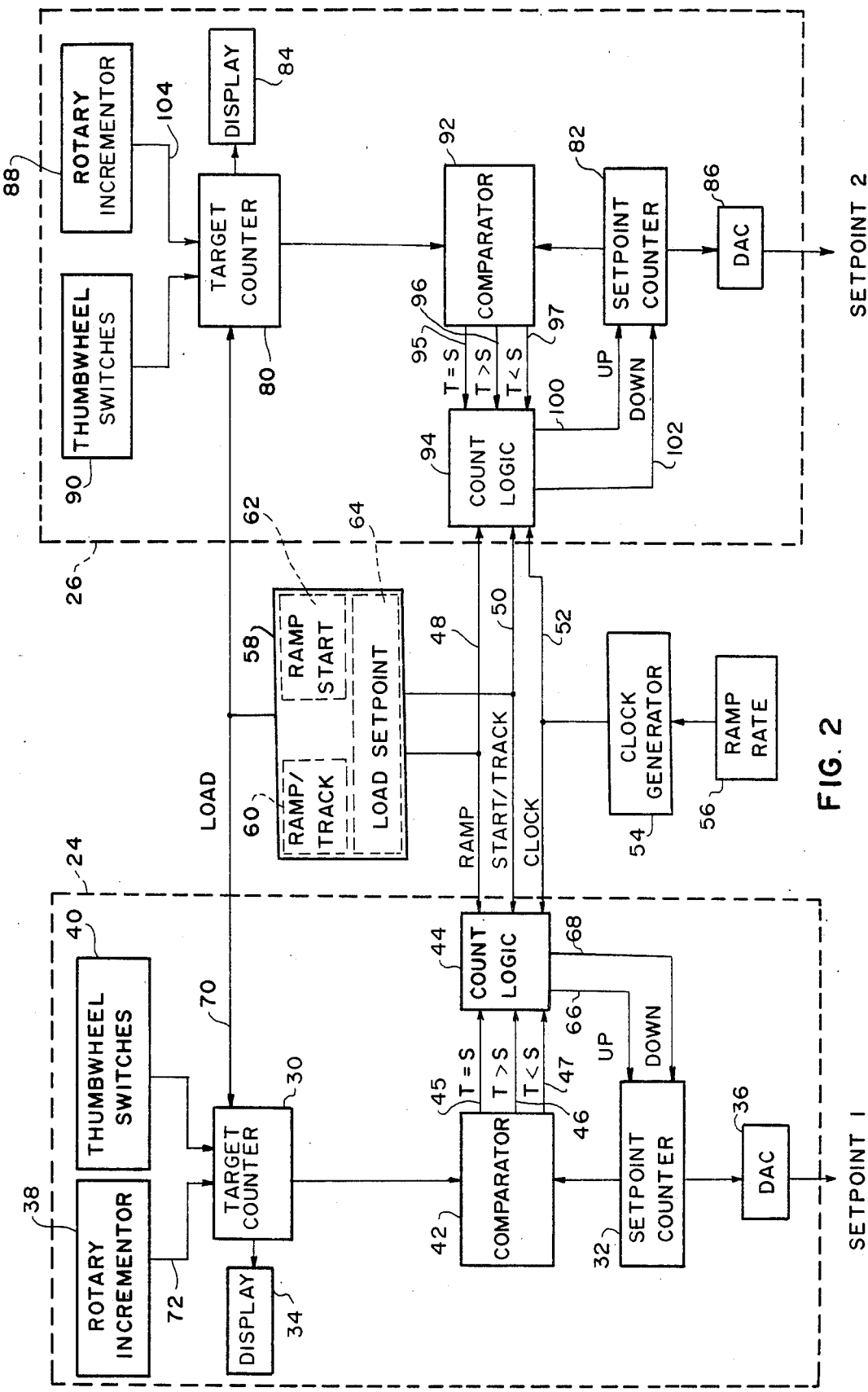
FIG. 2 is a block diagram of a dual setpoint controller system according to the present invention.

Setpoint controller 26 of the dual setpoint control system of FIG. 2 comprises target counter 80, setpoint counter 82, display 84, digital-to-analog converter 86, rotary incrementor 88, thumbwheel switches 90, comparator 92 and count logic 94, these elements being identical to the corresponding elements of setpoint controller 24. Count logic 94 receives the RAMP, START/TRACK and CLOCK signals on lines 48, 50 and 52 respectively, and target counter 80 receives the LOAD signal on line 70. The output of setpoint controller 26 is the analog signal SETPOINT 2.

The operation of the dual setpoint controller system of FIG. 2 will now be described. The setpoint controller system may be operated in either a RAMP mode or a TRACK mode, the choice between the RAMP and TRACK modes being selected by the operator by means of ramp/track switch 60. Assume for the moment that the RAMP mode is selected. In this mode, switch circuit 58 will provide the RAMP signal on line 48. The operator selects the ramp rate via ramp rate potentiometer 56, and enters target values for the two setpoints via conventional thumbwheel switches 40 and 90. Each of thumbwheel switches 40 and 90 comprise a series of dials by which an operator can specify a target setpoint value. The values specified by the thumbwheel switches affect the target values stored in the respective target counters only when the LOAD signal on line 70 is present. When appropriate values have been set on the thumbwheel switches, the operator depresses load setpoint switch 64, which results in a LOAD signal on line 70 that causes the values specified by the thumbwheel switches to be loaded into target counters 30 and 80 respectively. The target values contained in the target counters immediately appear on displays 34 and 84, respectively. If adjustment of either target values is required at this time, the corresponding thumbwheel switch may be modified, and the load setpoint switch again depressed. Alternatively, the target values may be adjusted via rotary incrementors 38 and 88. Rotary incrementors 38 and 88 are conventional incrementor/encoders that provide pulsed signals on lines 72, 104 respectively whenever the dials of the rotary incrementors are rotated by an operator. Such signals cause the respective target counters to count up or down by amounts corresponding to degrees of rotation of the dials, the direction of counting being controlled by the direction of rotation. Each target value can therefore be changed in a continuous manner by rotating the corresponding rotary incrementor dial. Operation of the rotary incrementors does not require the presence of a LOAD signal on line 70.

When the appropriate target values appear in displays 34 and 84, the operator may cause the setpoint values to begin ramping towards the target values by actuating ramp start switch 62. In RAMP mode, switch circuit 58 responds to actuation of the ramp start switch by producing a START/TRACK signal on line 50. In response to the START/TRACK signal, count logic 44 controls the signals on lines 66 and 68 in accordance with the signals on lines 45–47. In particular, if the signal on line 46 indicates that the target value is greater than the setpoint value, count logic 44 routes the clock pulses on line 52 to line 66, thereby causing setpoint counter 32 to count upward. If the signal on line 47 indicates that the target value is less than the setpoint value, then the clock pulses on line 52 are routed to line 68, causing the setpoint counter to count downward. When the signal on line 45 indicates that the target value is equal to the setpoint value, no signals are produced on either line 66 or 68. Count logic 94 controls lines 100 and 102 in an identical manner, to cause the setpoint value in setpoint counter 82 to ramp towards the target value in target counter 80.

In the RAMP mode, the ramping of the setpoint value towards the target value terminates as soon as the target and setpoint values are equal to each other. After such equal condition is reached, count logic 44 will no longer provide pulses on either of lines 66 or 68, even if the target value in target counter 30 is thereafter changed, until receipt of another START/TRACK signal on line 50. Count logic 94 operates in an identical manner. This feature permits the following sequence of operations. The operator loads target values into target counters 30 and 80 via thumbwheel switches 40 and 90 and load setpoint switch 64, and then depresses ramp start switch 62 to cause setpoint values to being ramping towards the target values at a rate selected through ramp rate potentiometer 56. While the setpoint values are ramping toward their respective target values, the operator may enter the next desired speed settings into the thumbwheel switches. After the setpoints have reached their initial target values, the operator may load the new target values into the target counters by depressing load setpoint switch 64. Thereafter, when it is desired to begin ramping toward the new target values, ramp start switch 62 is depressed, and the setpoint values begin ramping toward the new target values. It should be noted that if a new target value is loaded into a target counter before the setpoint value finishes ramping, then the setpoint value will immediately begin ramping towards the new target value.

When an operator selects TRACK mode via ramp/track switch 60, the RAMP signal on line 48 is not present, but the START/TRACK signal on line 50 is continuously present. In response to the START/TRACK signal, count logic 44 continuoulsy controls line 66 and 68 such that the setpoint value in setpoint counter 32 will always change towards the target value in target counter 30 whenever the target and setpoint values are unequal. Count logic 94 controls lines 100 and 102 in a similar manner. Thus in the TRACK mode, the setpoint counter will always track towards the target counter, regardless of whether the RAMP START switch is depressed. In TRACK mode, the target values in the target counters may be continuously changed by means of the respective rotary incrementors. The setpoint values will precisely track the target values, so long as the target values are not changed at a rate greater than th CLOCK signal provided by variable clock 52. If the rate of change of a target value exceeds the frequency of the clock pulses, then the clock frequency will limit the rate at which the corresponding setpoint value changes. In TRACK mode, switch circuit 58 will not generate a LOAD signal on line 70 even if load setpoint switch 64 is depressed, and the values specified by the thumbwheel switches are therefore irrelevant so long as the system remains in TRACK mode.

Figure 3:
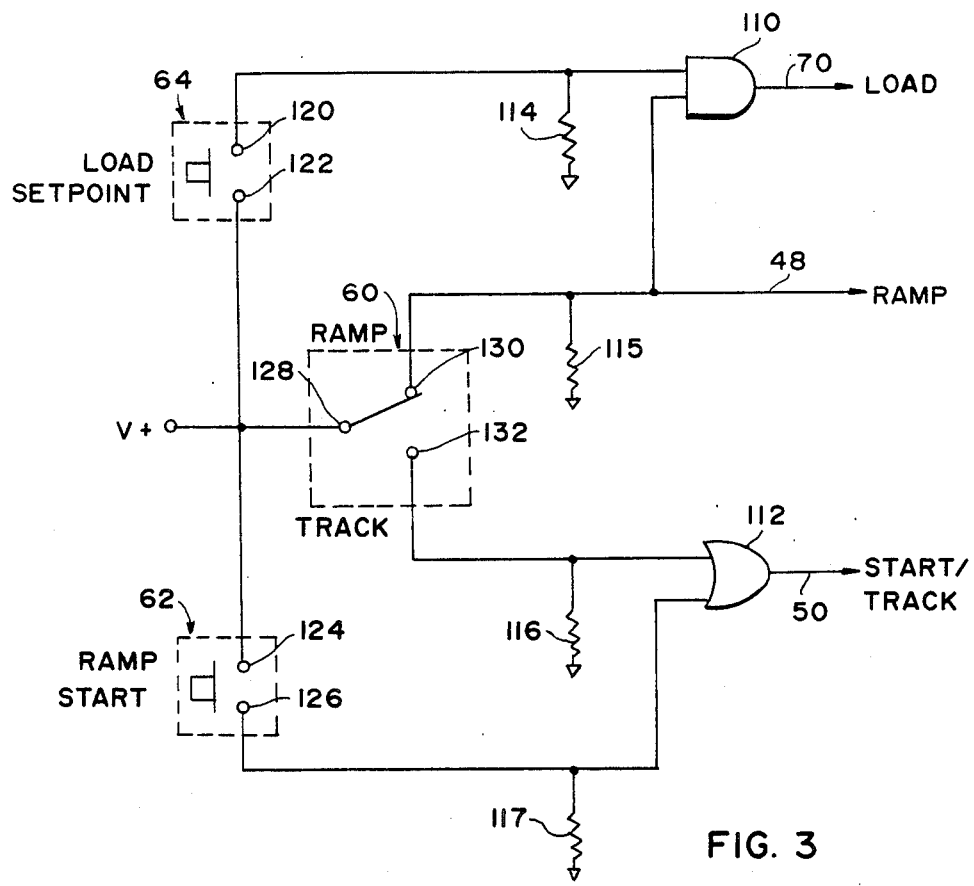
FIG. 3 is a circuit diagram of the switch circuit.

A suitable circuit for switch circuit 58 is set forth in FIG. 3. As illustrated, the switch circuit comprises load setpoint switch 64, ramp/track switch 60, ramp start switch 62, AND gate 110, OR gate 112, and resistors 114–117. Load setpoint switch 64 is a normally open switch comprising contacts 120 and 122. Contact 120 is connected to ground via resistor 114 and is also connected to one input of AND gate 110. Contact 122 is connected to positive voltage supply $V_+$. Ramp start switch 62 is also a normally open switch comprising terminals 124 and 126. Terminal 126 is connected to ground via resistor 117, and is also connected to one input of OR gate 112. Terminal 124 is connected to voltage supply $V_+$. Ramp/track switch 60 is a double throw switch comprising terminals 128, 130 and 132. Common terminal 128 is connected to voltage supply $V_+$. Terminal 130 is connected to ground via resistor 115, and is also connected to the other input of AND gate 110. Terminal 132 is connected to ground via resistor 116, and is connected to the other input of OR gate 112. The output of AND gate 110 is the LOAD signal on line 70. The output of OR gate 112 is the START/TRACK signal on line 50. The signal at terminal 130 of ramp/track switch 60 comprises the RAMP signal on line 48.

When the RAMP mode is selected, ramp/track switch is in the position shown in FIG. 3, and the RAMP signal on line 48 is therefore high. The RAMP signal forms one of the inputs to AND gate 110. Therefore in RAMP mode, depressing load setpoint switch 64 will cause a high LOAD signal to appear on line 70. Also in the RAMP mode, terminal 132 is held at ground potential through resistor 116, and the START/TRACK signal on line 50 therefore follows the voltage at terminal 126. Depressing ramp/start switch 62 therefore produces a START/TRACK signal on line 50.

When ramp/track switch 60 is in the TRACK position, resistor 115 causes the RAMP signal on line 48 to be low, thereby disabling AND gate 110 and blocking the production of a LOAD signal on line 70. However in the TRACK mode, the high voltage at terminal 132 generates a START/TRACK signal on line 50 irrespective of the actuation of ramp/start switch 62.

Figure 4:
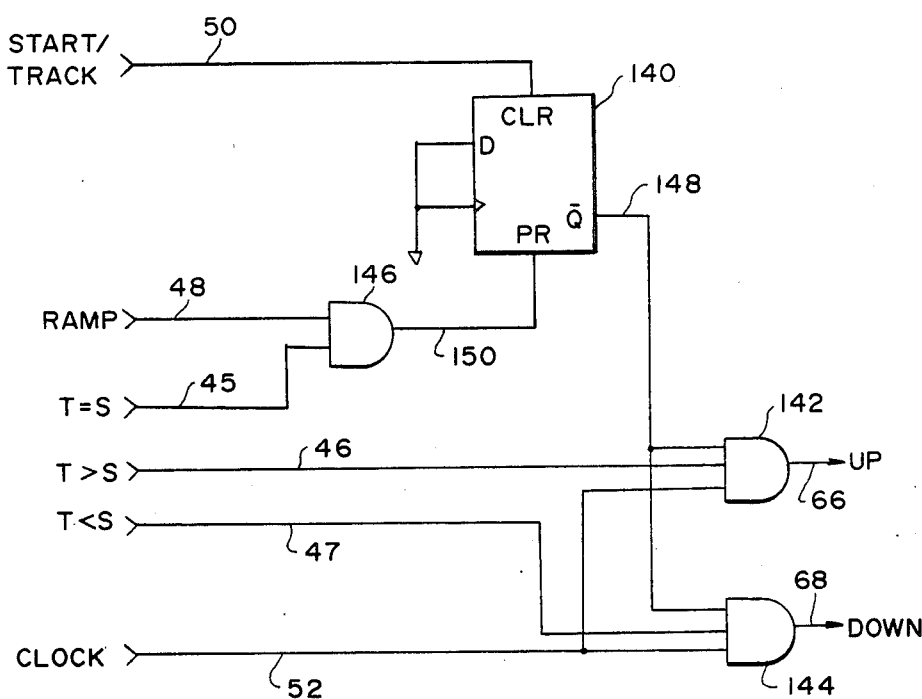
FIG. 4 is a circuit diagram of the count logic.

A suitable circuit for count logic 44 (or count logic 94) is illustrated in FIG. 4. The count logic circuit comprises flip-flop 140, and AND gates 142, 144 and 146. The count logic circuit receives the START/TRACK signal on line 50, the RAMP signal on line 48, the CLOCK signal on line 52, as well as the signals on lines 45–47 indicating the relative values of the target value and setpoint value. The START/TRACK signal is provided to the clear (CLR) input of flip-flop 140, and the output of AND gate 146 on line 150 is input to the preset (PR) input of flip-flop 140. The data (D) and CLOCK inputs of flip-flop 140 are grounded, and the $\overline{Q}$ output of flip-flop 140 on line 148 forms one of the inputs to each of AND gates 142 and 144. A second input to each AND gate is the CLOCK signal on line 52. The third input to AND gate 142 is the signal on line 46 (T>S), and the third input to AND gate 144 is the signal on line 47 (T<S). The output of AND gate 142 is the UP signal on line 66, and the output of AND gate 144 is the DOWN signal on line 68.

The operation of the count logic circuit of FIG. 5 can be described by first assuming that the system is in the RAMP mode. The resulting high signal on line 48 enables AND gate 146, such that the output of the AND gate on line 150 is controlled by the signal on line 45 (T=S). As described below, flip-flop 140 will initially be preset, such that the $\overline{Q}$ output on line 148 is low, thereby disabling AND gates 142 and 144. In this state, neither the UP nor DOWN signal will be produced, regardless of the signals on lines 45–47. However, in response to a START/TRACK signal on line 50, flip-flop 140 is cleared, resulting in a high signal on line 148 that enables AND gates 142 and 144. Thereafter, if the target value is greater than the setpoint value, a signal will appear on line 46, with the result that the CLOCK pulses on line 52 will appear on line 66, and the setpoint value will be incremented towards the target value. Similarly, if the setpoint value is greater than the target value, the signal on line 47 will cause the CLOCK pulses on line 52 to appear on line 68, and the setpoint value will be decremented towards the target value. As soon as the target and setpoint values are equal, a signal on line 45 will preset flip-flop 140, thereby disabling AND gates 142 and 144 until the receipt of the next START/TRACK signal on line 50. When the system is in the TRACK mode, the LOW signal on line 48 disables AND gate 146, and flip-flop 140 is never preset. The START/TRACK signal on line 50 clears flip-flop 140, with the result that AND gates 134 and 136 are continuously enabled. The appearance of the UP signal on line 66 or the DOWN signal on line 68 is therefore controlled by the signals on lines 46 and 47 respectively.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A setpoint controller, comprising:
   target means operative to store a digital target value;
   control means for enabling an operator of the setpoint controller to control the target value;
   setpoint means operative to store a digital setpoint value; and
   comparison means operative when the setpoint value is not equal to the target value for causing the setpoint value to change at a selected rate toward the target value.

2. The setpoint controller of claim 1, further comprising display means for displaying the target value.

3. The setpoint controller of claim 1, further comprising means for converting the setpoint value to a corresponding analog signal.

4. The setpoint controller of claim 1, wherein the control means comprises means for storing a load value entered by the operator, and means for setting the target value equal to the load value in response to a load signal.

5. The setpoint controller of claim 4, wherein the control means includes tracking means including a movable member and means operative to increment the target value when the movable member is moved in one direction and to decrement the target value when the movable member is moved in the opposite direction.

6. The setpoint controller of claim 1, wherein the comparison means further comprises means controllable by the operator for varying the selected rate at which the setpoint value changes towards the target value.

7. The setpoint controller of claim 1, wherein the comparison means comprises logic means having first and second states, the comparison means being operative to cause the setpoint value to change toward the target value only when the logic means is in the first state, the logic means being adapted to change from the first to the second state when the setpoint value equals the target value and to change from the second to the first state upon receipt of a start signal.

8. The setpoint controller of claim 7, further comprising mode selection means for enabling the operator to cause the logic means to remain in the first state, whereby the comparison means causes the setpoint value to change toward the target value regardless of whether the start signal has been received.

9. A dual setpoint controller system comprising first and second setpoint controllers, the first setpoint controller comprising first target means operative to store a digital first target value, first control means for enabling an operator of the setpoint controller system to control the first target value, first setpoint means operative to store a digital first setpoint value, and first comparison means operative when the first setpoint value is not equal to the first target value for causing the first setpoint value to change at a selected rate toward the first target value, the second setpoint controller comprising second target means operative to store a digital second target value, second control means for enabling an operator of the setpoint controller system to control the second target value, second setpoint means operative to store a digital second setpoint value, and second comparison means operative when the second setpoint value is not equal to the second target value for causing the second setpoint value to change at said selected rate toward the second target value, whereby the first and second setpoint values can be caused to change towards different target values at the same rate.

10. The setpoint controller system of claim 9, further comprising first and second display means for displaying the first and second target values, respectively.

11. The setpoint controller system of claim 9, further comprising first and second conversion means for converting the first and second setpoint values respectively to corresponding analog signals.

12. The setpoint controller system of claim 9, wherein the first control means comprises first input means for storing a first load value entered by the operator, wherein the second control means comprises second input means for storing a second load value entered by the operator, and wherein the first and second control means each comprise means for setting the respective first and second target values equal to the respective first and second load values in response to a single load signal.

13. The setpoint controller system of claim 9, further comprising means controllable by the operator for varying the selected rate at which the first and second setpoint values change toward the first and second target values respectively.

14. The setpoint controller system of claim 9, wherein the first and second comparison means comprise respective first and second logic means, each logic means having first and second states, each comparison means being operative to cause the respective setpoint value to change toward the respective target value only when the respective logic means is in the first state, each logic means being adapted to change from the first to the second state when the respective setpoint value equals the respective target value, and to change from the second to the first state upon receipt of a start signal, the start signal being common to the first and second setpoint controllers.

15. The setpoint controller system of claim 14, further comprising mode selection means for enabling the operator to cause both logic means to remain in their respective first states, whereby each comparison means causes the respective setpoint value to change towards the respective target value regardless of whether the start signal has been received.

* * * * *